United States Patent
Moerner et al.

(10) Patent No.: US 7,068,698 B2
(45) Date of Patent: Jun. 27, 2006

(54) ROOM-TEMPERATURE SOURCE OF SINGLE PHOTONS BASED ON A SINGLE MOLECULE IN A CONDENSED MATTER HOST

(75) Inventors: William E. Moerner, Los Altos, CA (US); Brahim Lounis, Bordeaux (FR)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 295 days.

(21) Appl. No.: 10/794,404

(22) Filed: Mar. 4, 2004

(65) Prior Publication Data
US 2004/0218649 A1    Nov. 4, 2004

Related U.S. Application Data

(63) Continuation-in-part of application No. 10/071,889, filed on Feb. 7, 2002, now abandoned.

(60) Provisional application No. 60/266,955, filed on Feb. 7, 2001.

(51) Int. Cl.
*H01S 3/091* (2006.01)
*H01S 3/092* (2006.01)
*H01J 7/24* (2006.01)
*H05B 31/26* (2006.01)

(52) U.S. Cl. .................................. 372/70; 315/111.81

(58) Field of Classification Search ............. 372/29.02, 372/29.021, 31, 32, 70; 315/111.81
See application file for complete search history.

(56) References Cited

U.S. PATENT DOCUMENTS 5,528,046 A * 6/1996 Ishikawa ................. 250/461.2
6,657,222 B1 * 12/2003 Foden et al. ................. 257/13
6,868,103 B1 * 3/2005 Gerard et al. ................ 372/32
6,956,330 B1 * 10/2005 Santori et al. .......... 315/111.81
2002/0196827 A1 * 12/2002 Shields et al. ............... 372/45
2004/0109633 A1 * 6/2004 Pittman et al. ............... 385/16

FOREIGN PATENT DOCUMENTS

EP       1 503 328 A1 *  2/2005
GB       2 362 261 A  * 11/2001

(Continued)

OTHER PUBLICATIONS

Lukishova et al., "Dye-doped cholerstic-liquid-crystal room-temperature single-photon source," Journal of Modern Optics, Jun. 15-Jul. 10, 2004, vol. 51, No. 9-10, 1535-1547.*

(Continued)

*Primary Examiner*—Don Wong
*Assistant Examiner*—Leith Al-Nazer
(74) *Attorney, Agent, or Firm*—Lumen Intellectual Property Services, Inc.

(57) ABSTRACT

A controllable single-photon source having a single illuminated molecule in a condensed phase host is provided. The single molecule is illuminated with a pulse of radiation having a wavelength such that the molecule is excited to a vibrational state higher in energy than an associated excited electronic state. The molecule rapidly, incoherently and irreversibly decays, with a lifetime Tvib, from the vibrational state to the excited electronic state by transferring the corresponding vibrational energy to the host. The excited electronic state has a lifetime T, and with high probability the single molecule makes a radiative transition from this state to emit a single photon. The pump pulse duration Tp satisfies the condition Tvib<Tp<T. Room temperature operation and spectral separation of pump and single-photon radiation are thereby provided. A semiconductor nanocrystal can be used instead of a molecule.

44 Claims, 6 Drawing Sheets

FOREIGN PATENT DOCUMENTS

| WO | WO 2004/064297 | 7/2004 |
|---|---|---|
| WO | WO 2004/064297 A2 * | 7/2004 |

OTHER PUBLICATIONS

Lukishova et al., "Room Temperature Single-Photon Source: Single-Dye Molecule Fluorescence in Liquid Crystal Host," IEEE Journal of Selected Topics in Quantum Electronics, vol. 9, No. 6, Nov./Dec. 2003, pp. 1512-1518.*

"Demonstration of a Room-Temperature Single-Photon Source for Quantum Information: Single-Dye-Molecule Fluorescence in a Cholesteric Liquid Crystal Host," Quarterly Report DOE/SF/19460-485, Laboratory for Laser Energetics, U. Rochester, v. 94, Jan.-Mar. 2003.*

Fleury et al., "Nonclassical Photon Statistics in Single-Molecule Fluorescence at Room Temperature," Feb. 7, 2000, The American Physical Society, vol. 84, No. 6, pp. 1148-1151.*

Brunel et al., "Triggered Source of Single Photons based on Controlled Single Molecule Fluorescence," Oct. 4, 1999, The American Physical Society, vol. 83, No. 14, pp. 2722-2725.*

Marcel Bruchez Jr., "Semiconductor Nanocrystals as Fluorescent Biological Labels," Sep. 25, 1998, Science, vol. 281, pp. 2013-2016.*

Kuhn et al., "Controlled generation of single photons from a strongly coupled atom-cavity system," 1999, Applied Physics B 69, pp. 373-377.*

L. Fleury et al., "Nonclassical Photon Statistics in Single-Molecule Fluorescence at Room Temperature," Feb. 7, 2000, The American Physical Society, vol. 84, No. 6, pp. 1148-1151.

Christian Brunel et al., "Triggered Source of Single Photons based on Controlled Single Molecule Fluorescence," Oct. 4, 1999, The American Physical Society, vol. 83, No. 14, pp. 2722-2725.

Stephen Empedocles et al., "Spectroscopy of Single CdSe Nanocrystallites," 1999, Accounts of Chemical Research, vol. 32, No. 5, pp. 389-396.

Warren C. W. Chan et al., "Quantum Dot Bioconjugates for Ultrasensitive Nonisotopic Detection," Sep. 25, 1998, Science, vol. 281, pp. 2016-2018.

A. Kuhn et al., "Controlled generation of single photons from a strongly coupled atom-cavity system," 1999, Applied Physics B 69, pp. 373-377.

Svetlana G. Lukishova et al, "Dye-doped cholesteric-liquid-crystal room-temperature single-photon source," Journal of Modern Optics, Jun. 15-Jul. 10, 2004, vol. 51, No. 9-10, 1535-1547.

Svetlana G. Lukishova et al., "Room Temperature Single-Photon Source: Single-Dye Molecule Fluorescence in Liquid Crystal Host," IEEE Journal of Selected Topics in Quantum Electronics, vol. 9, No. 6, Nov./Dec. 2003, pp. 1512-1518.

* cited by examiner

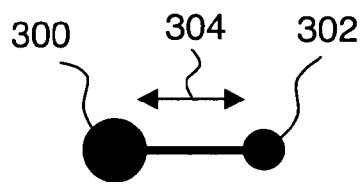
Fig. 3a        Fig. 3b        Fig. 3c
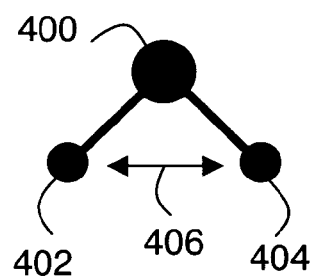
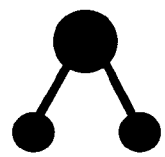
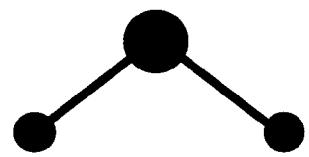
Fig. 4a        Fig. 4b        Fig. 4c Fig. 6a
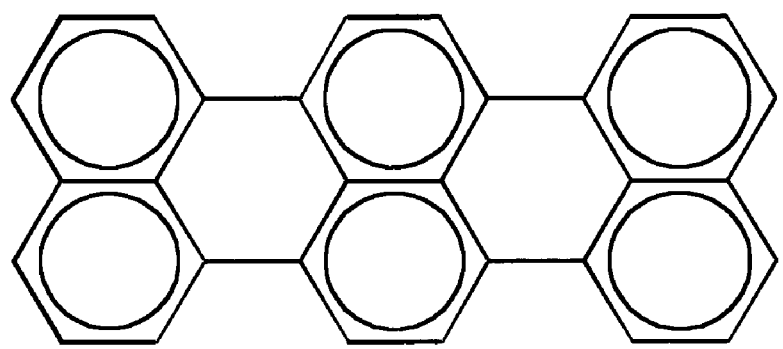
Fig. 6b
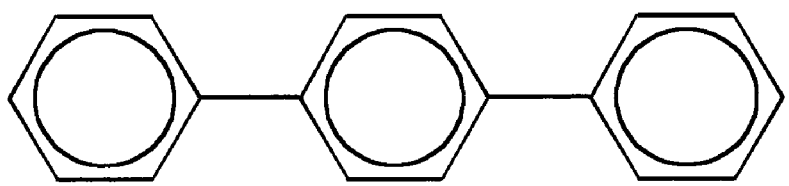
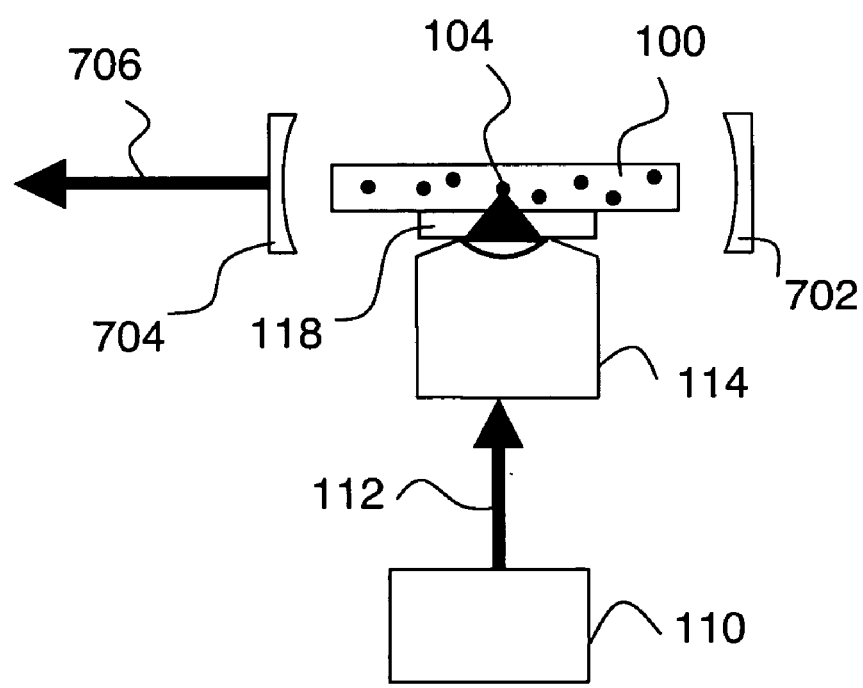
Fig. 7

ROOM-TEMPERATURE SOURCE OF SINGLE PHOTONS BASED ON A SINGLE MOLECULE IN A CONDENSED MATTER HOST

CROSS REFERENCE TO RELATED APPLICATIONS

This application is a continuation in part of application Ser. No. 10/071,889 filed on Feb. 7, 2002 now abandoned, and hereby incorporated by reference. Application Ser. No. 10/071,889 claims priority from provisional application 60/266,955 filed on Feb. 7, 2001.

STATEMENT REGARDING FEDERALLY SPONSORED RESEARCH OR DEVELOPMENT

This invention was supported in part by grant number MCB9816947 from the National Science Foundation. The U.S. Government has certain rights in this invention.

FIELD OF THE INVENTION

This invention relates to controllable sources of single photons.

BACKGROUND

A controllable single-photon source is an optical source that emits, with high probability, one and only one photon in response to an external triggering event. Controllable single-photon sources are of interest for applications in quantum information processing, quantum cryptography, and quantum computation.

Controllable single-photon sources are typically based on the preparation of a quantum system, such as an atom or a molecule, in an excited state that can make a radiative transition to a lower energy state by emitting a single photon. For example, a two level system, or an atom or molecule that effectively acts as a two level system, can be prepared in an excited state by appropriate on-resonance optical pumping. Here on-resonance means the pump photon energy is equal to the two level transition energy, and is thus also equal to the emitted photon energy. Since a quantum system that is continuously driven by an on-resonance pump will emit a succession of photons at random times, a non-continuous pumping scheme is required. Pumping an atom or molecule with a short, intense pulse of on-resonance pump light is, at least conceptually, a simple method for providing a single-photon source.

However, this approach has significant practical drawbacks. The first drawback is that intense coherent optical pumping of a two level system leads to Rabi oscillations, where the probability of occupancy of the upper and lower states are $\sin^2(\Omega t)$ and $\cos^2(\Omega t)$ respectively, where $\Omega$ is the Rabi frequency and t is time. The Rabi frequency depends, in part, on the optical pump intensity. Thus, in order to prepare a quantum system in its upper level, $\Omega T_p$ must equal $\pi$ (or an odd multiple thereof), where $T_p$ is the pulse duration. Furthermore, the pulse duration $T_p$ must be less than the upper level dephasing time. A pump pulse satisfying this condition is referred to as a "$\pi$ pulse". Such pulses are not easy to provide in practice, since a particular relation between pulse intensity and duration must be satisfied. More precisely, the time-integral of a certain function of the optical electric field over the pulse duration must equal $\pi$ or an odd multiple of $\pi$. Another drawback of this conceptually simple approach is that the pump radiation and single-photon radiation have the same wavelength, which complicates the task of separating the single-photon radiation from the residual pump radiation.

Thus experimental demonstrations of single-photon sources have followed other approaches. For example, a "turnstile" effect based on a Coulomb blockade for electrons and holes in a mesoscopic double-barrier p-n junction has provided a single-photon source (Nature, 397, 500–503, 1999). However, this experiment had to be performed at an exceedingly low temperature (i.e. 50 mK), and the sample geometry made collection of single-photon light difficult (i.e., the detection efficiency was about 1 part in $10^{-4}$).

Another experimental demonstration made use of rapid adiabatic following to prepare a molecule in an excited state (Brunel et al., Physical Review Letters, 83(14), 2722–2725, 1999). In rapid adiabatic following, continuous-wave pumping is employed, but the sample and pump are swept through the on-resonance condition, either by changing the pump photon energy or by altering the resonant energy of the quantum system within the sample (e.g., by applying a secondary electric field to Stark shift the relevant optical transition). Rapid adiabatic following provides less critical conditions on the pumping parameters than the use of $\pi$ pulse pumping.

In this experiment, the active molecule was dibenzanthanthrene in an n-hexadecane matrix, an RF electric field was applied to the sample to Stark shift its transition energy relative to the pump photon energy, the sample temperature was 1.8 K, and the detection efficiency was about $3 \times 10^{-3}$. Low temperatures were required to force the optical absorption line to be extremely narrow, in order to be able to Stark shift the transition energy by a significant fraction of the absorption linewidth with experimentally accessible secondary electric fields. The absorption linewidth is about $10^4$ to $10^5$ times larger at room temperature than at temperatures <4K. Thus, attempting to perform the experiment of Brunel at room temperature would require increasing the RF electric field by the same factor (i.e., $10^4$ to $10^5$), since the Stark shift is typically proportional to electric field. Such large electric fields are difficult or even impossible (if electric breakdown occurs) to provide in practice.

Disadvantages of this approach include low sample temperature and required narrow absorption making it difficult to implement this approach at temperatures greater than 10K. Moreover, the requirement of maintaining the sample in a cryostat contributes to the low detection efficiency. Adiabatic following has also been proposed, although not experimentally demonstrated, for a single-photon source including an atom that must be strongly coupled to a cavity (Applied Physics B, 69, 373–377, 1999).

A common feature of the above experimental approaches is that the optical excitation is on-resonance with a purely electronic transition from a ground state to an excited electronic state. As a consequence of this, the wavelength(s) of single-photon emission include the pump wavelength. Another common feature of the above approaches is that they are all coherent. More specifically, in these approaches, the state of the quantum system evolves in time according to the equations of density matrix quantum mechanics for all times between the beginning of pumping and the emission of a photon responsive to the pumping. If this coherent time evolution is interrupted by an external perturbation, such as a thermal perturbation, the desired processes leading to single photon emission tend to be disrupted. For example, even if an RF electric field sufficient to attempt the experiment of Brunel et al. at room temperature were provided, the performance of such an arrangement as a single photon source would be greatly inferior to its performance at cryogenic temperatures. This requirement of coherent time evolution is the basic reason why the above experimental results were only obtainable at ultra-low temperatures.

Therefore, there is an unmet need in the art for a room temperature single-photon source, and also for such a source having distinct pump and emission wavelengths.

SUMMARY

The present invention provides a controllable single-photon source having a single illuminated molecule in a condensed phase host. The single molecule is illuminated with a pulse of radiation having a wavelength such that the molecule is excited to a vibrational state higher in energy than an associated excited electronic state. The molecule rapidly, incoherently and irreversibly decays, with a lifetime Tvib, from the vibrational state to the excited electronic state by transferring the corresponding vibrational energy to the host. The excited electronic state has a lifetime T, and with high probability the single molecule makes a radiative transition from this state to emit a single photon. The pump pulse duration Tp satisfies the condition Tvib<Tp<T. Room temperature operation and spectral separation of pump and single-photon radiation are thereby provided. In an alternate embodiment, a semiconductor nanocrystal is used instead of a molecule.

BRIEF DESCRIPTION OF THE DRAWINGS

FIGS. 3a–3c show a vibrational mode of a diatomic molecule.

FIGS. 4a–4c show a vibrational mode of a triatomic molecule.

FIG. 6a shows the chemical structure of terrylene.

FIG. 6b shows the chemical structure of p-terphenyl.

FIG. 7 shows an apparatus for illuminating the single molecule of FIG. 1a where an optical cavity is used to collect single-photon radiation in accordance with an embodiment of the invention.

DETAILED DESCRIPTION

Figure 1A:
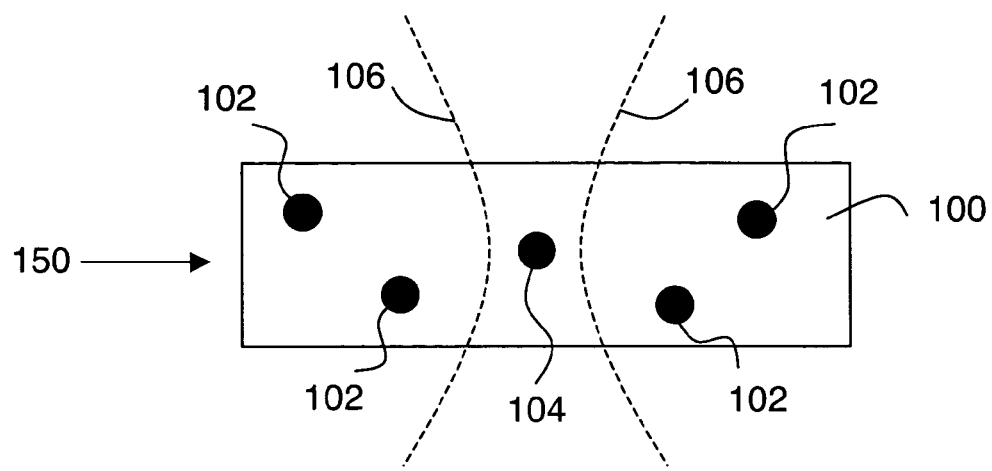
FIG. 1a shows a single illuminated molecule embedded within a host medium, in accordance with an embodiment of the invention.

FIG. 1a shows a single illuminated molecule embedded within a host medium, in accordance with an embodiment of the invention. An active medium 150 includes a host medium 100, and an illuminated molecule 104 which is chemically distinct from host medium 100. Optionally, other molecules 102, also chemically distinct from host medium 100, may be included in active medium 150. Molecule 104, and molecules 102 (if present), are fluorescent responsive to pump radiation 106. Active medium 150 is illuminated with optical radiation 106, which illuminates molecule 104. Let signal S be the intensity of radiation from illuminated molecule 104, and background B be the total intensity of all other radiation from active medium 150 responsive to pump radiation 106. The radiation emitted from active medium 150 is substantially radiation emitted from illuminated molecule 104. Preferably, S/B>5, and more preferably S/B>10. Processes which contribute to background B include fluorescence or scattering from host medium 100, and radiation from molecules 102 illuminated by radiation 106 with less intensity than is provided to illuminated molecule 104. Host medium 100 is transparent (i.e., substantially non-absorbing) to both pump radiation 106 and radiation emitted by molecule 104.

Host medium 100 is preferably a solid material, such as a molecular crystal or an amorphous organic solid, and more preferably is p-terphenyl having the chemical structure shown in FIG. 6b. Suitable materials for molecule 104 include, but are not limited to, planar aromatic hydrocarbons such as terrylene, derivatives of terrylene, dibenzoanthanthrene, derivatives of dibenzoanthanthrene, pentacene, derivatives of pentacene, perylene, and derivatives of perylene. Terrylene having the chemical structure shown in FIG. 6a is a preferred material for molecule 104.

Figure 1B:
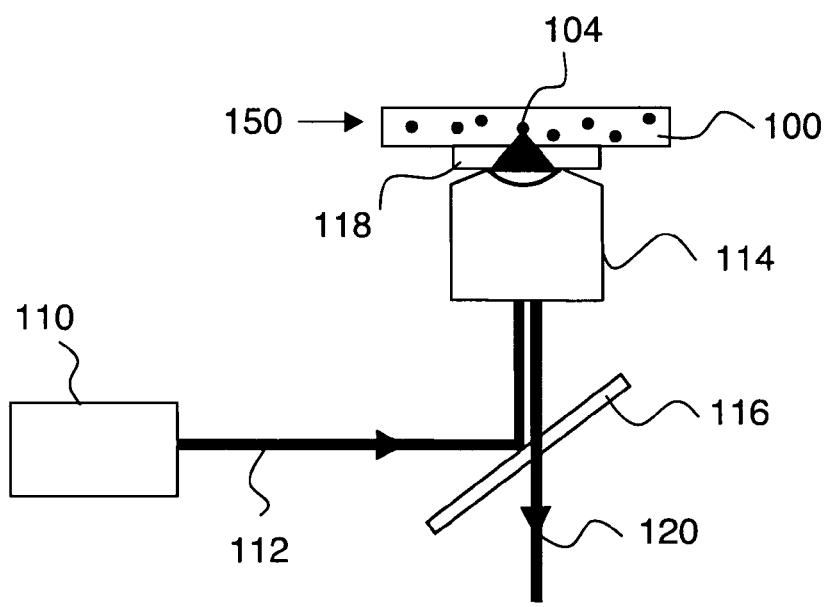
FIG. 1b shows an apparatus for illuminating the single molecule of FIG. 1a in accordance with an embodiment of the invention.

FIG. 1b shows an apparatus for illuminating single molecule 104 in accordance with an embodiment of the invention. Optical source 110 emits pump radiation 112 which is reflected from dichroic mirror 116 and received by microscope objective 114. Microscope objective 114 focuses pump radiation 112 onto illuminated molecule 104 in host medium 100. Radiation 120 emitted from molecule 104 is collected by microscope objective 114 and transmitted through dichroic mirror 116. As seen below, pump radiation 112 and molecule radiation 120 have different wavelengths, which allows wavelength-dependent beam separation as shown.

In one experiment, active medium 150 is a sublimed crystal flake of p-terphenyl (i.e., host medium 100) doped with terrylene (i.e., molecules 104 and 102) at a concentration of about $10^{-11}$ mole/mole, and is at room temperature. The thickness of the crystalline flake is a few microns. For this active medium, we have found that flakes having a thickness preferably on the order of 10 microns provide improved photobleaching stability for dopant terrylene molecules compared to thinner flakes.

Photobleaching is a process where a molecule permanently loses the ability to perform its normal radiative optical transitions after absorbing a certain number of photons. The photobleaching quantum efficiency (PQE) of a molecule is a quantitative measure of photostability, defined as the probability of photobleaching per photon absorbed by the molecule. For example, a molecule having a PQE of $10^{-4}$ will photobleach, on average, after absorbing 10,000 photons. Preferably the PQE is less than about $10^{-7}$, and is more preferably less than about $10^{-8}$, and is most preferably as far below $10^{-8}$ as possible, to provide a stable single-photon source. In this experiment, high photostability is obtained (i.e., estimated PQE is $10^{-9}$ or less in some cases), attributed to protection of molecule 104 of terrylene from diffusing quenchers (such as oxygen) by host medium 100 of p-terphenyl, and to the ability of molecule 104 to emit host phonons to prevent thermally induced damage.

In the experiment of FIG. 1b, optical source 110 is an actively mode locked Nd:YAG laser (Lightwave Electronics model 131) providing 35 ps pulses of 1064 nm radiation at a repetition rate of 100 MHz and a time-average power of 220 mW. A pulse picker (not shown) is used to reduce the repetition rate to 6.25 MHz. The pulses of 1064 nm radiation are passed through a periodically poled lithium niobate frequency doubler (not shown) to provide radiation 112 of pulses of 532 nm radiation having a maximum time-average power of 0.2 mW and a repetition rate of 6.25 MHz. In performing the experiment, the time average pump power delivered to active medium 150 is attenuated to about 75 µW or less. Microscope objective 114 is an oil-immersion objective having a numerical aperture of 1.4. Pump radiation 112 is focused by objective 114 and passes through oil film 118 to impinge on illuminated molecule 104 within host medium 100. In some cases, host medium 100 is mechanically supported by a glass slide (not shown) above oil film 118.

Radiation 120 emitted by illuminated molecule 104 has a wavelength of about 579 nm, and is collected by microscope objective 114. Radiation 120 is transmitted through dichroic mirror 116, which separates molecule radiation 120 from pump radiation 112, since pump radiation 112 is at 532 nm and molecule radiation 120 is at about 579 nm. Residual 532 nm light is filtered from radiation 120 with a holographic notch filter (at 532 nm) and a long pass glass filter (both not shown).

In this experiment, single-photon emission is verified in two steps. In the first step, illumination of only a single molecule is verified by observation of photon antibunching correlations in a Hanbury-Brown and Twiss measurement using continuous-wave illumination. In the second step, the probability P1 of emission of a single photon responsive to a single pulse of pump radiation 112 is computed from experimentally measured data. Two determinations of P1 of 0.83 and 0.88, in good agreement, are obtained from experimental data using two different computation methods. Furthermore, this result demonstrates that the embodiment of FIG. 1b provides a highly efficient source of single photons, since P1 is high, and in fact is quite close to the maximum possible value of unity.

Figure 2:
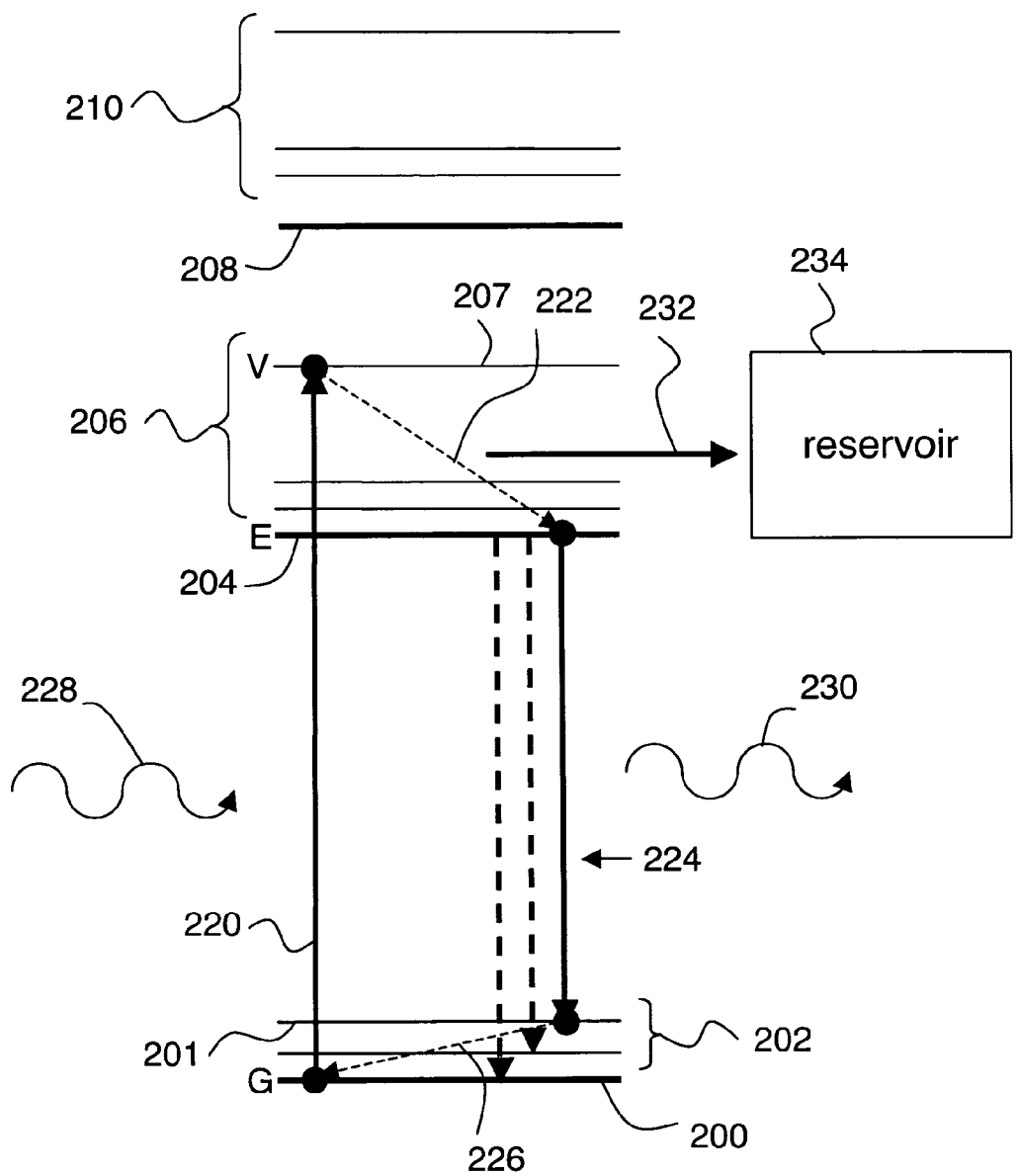
FIG. 2 shows an energy level diagram of molecular transitions in accordance with an embodiment of the invention.

The operation of the embodiment of FIGS. 1a and 1b is best understood with reference to FIG. 2, showing a simplified energy level diagram of illuminated molecule 104 in a solid host medium 100. Molecule 104 has a ground state 200, as well as numerous excited electronic states, two of which are shown as 204 and 208. Associated with electronic states 200, 204 and 208 are vibrational manifolds 202, 206, and 210 respectively. Such vibrational manifolds, which do not exist in atoms, are the quantum mechanical manifestation of the internal degrees of freedom of molecule 104. Since molecule 104 is embedded within a solid host medium 100, the only relevant internal degrees of freedom are vibrational, since the rotational degrees of freedom present in a free molecule are suppressed. Thus the following discussion will only consider vibration.

The atoms in a molecule can be regarded as being connected by bonds which act much as springs do, in that deviations from a nominal position are opposed by a restoring force. FIGS. 3a–3c show one example, where a diatomic molecule having atoms 300 and 302 can oscillate in a vibrational mode 304 between a position of maximum bond length shown on FIG. 3b and a position of minimum bond length shown on FIG. 3c. Similarly, FIGS. 4a–4c show another example, where a triatomic molecule having atoms 400, 402, and 404 can oscillate in a vibrational mode 406 between a position of minimum bond angle shown on FIG. 4b and a position of maximum bond angle shown on FIG. 4c. Generally, a vibrational mode is a distinct pattern of mechanical motion of the atoms relative to each other determined by the symmetry of the molecule. Small molecules tend to have a small number of modes, while large molecules can have a very large number of modes.

If molecules obeyed the laws of classical physics, an arbitrary vibrational excitation of the molecule could be expressed as a linear superposition of vibrational modes, each vibrational mode having an oscillation energy En which can take on any value. Here n indexes the modes. Equivalently, each vibrational mode would have an amplitude An which can take on any value. However, molecules are quantum-scale systems, and therefore the mode oscillation energies En are quantized. For each mode n, En can only take on certain discrete values Enm, where the index m accounts for the quantization of vibrational energy. The energy levels Enm (for each quantized energy for each mode) are vibrational levels. For each electronic state of a molecule, there are numerous associated vibrational states which have the same electronic configuration and which have different vibrational configurations. This set of vibrational states associated with an electronic state is referred to as a vibrational manifold. For example, vibrational manifold 202 is associated with electronic state 200, and vibrational manifold 206 is associated with electronic state 204.

For clarity, we adopt the following terminology. An "electronic state" of a molecule is defined to be a state having minimal vibrational energy for a given electronic configuration. For example, states 200, 204 and 208 on FIG. 2 are all electronic states, since they have lower energy than any states within their respective vibrational manifolds 202, 206, and 210. A "vibrational state" of a molecule is defined to be a state having non-minimal vibrational energy for a given electronic configuration.

Thus the process shown in FIG. 2 includes the following steps: 1) a transition 220 from ground state 200 (an electronic state) to a vibrational state 207; 2) a transition 222 from vibrational state 207 to an associated electronic state 204; 3) a transition 224 from electronic state 204 to a vibrational state 201 associated with ground state 200; and 4) a transition 226 from vibrational state 201 to ground state 200.

Transition 220 is induced by absorption of a pump photon 228 from a pulse of pump radiation provided by a pump source (such as 110 on FIG. 1b). The photon energy Ep of the pump radiation is equal to the energy difference between ground state 200 and vibrational state 207, due to conservation of energy. Since a key feature of the present invention is excitation of ground state 200 to a vibrational state (such as 207), it follows that the photon energy Ep of the pump must be greater than the energy difference Eo between electronic states 204 and 200. In other words, the pump photon energy (or equivalently, the pump wavelength) is selected to be greater than the energy difference between electronic states 204 and 200. In this manner, excitation to a vibrational state (as opposed to an electronic state) is ensured. Since vibrational energy is quantized, Ep–Eo will be greater than or equal to one vibrational energy quantum. Typically, if Ep is somewhat larger than Eo (e.g., Ep>1.05 Eo), the required condition that Ep–Eo be greater than one quantum of vibrational energy will be satisfied, since the vibrational energy quantum is usually much less than Eo.

Transition 222 from vibrational state 207 to its associated electronic state 204 is a fast, nonradiative, spontaneous, irreversible, and incoherent transition, having a characteristic vibrational relaxation time (or lifetime) of Tvib. Intramolecular vibrational relaxation, which is the physical process of transition 222, has been extensively investigated, and as a result Tvib is known for many molecule—host combinations. Transition 222 is another key feature of the invention.

In order to make a transition from vibrational state 207 to electronic state 204, molecule 104 must transfer an energy 232 to host medium 100 equal to the energy difference between states 207 and 204. Since molecule 104 is embedded within host medium 100, host medium 100 acts as a macroscopic reservoir 234 capable of absorbing this energy difference. Due to this coupling between molecule 104 and host 100, the rate of transition 222 in the present invention is greatly increased compared to the rate of transition 222 in a free molecule or a in molecule in a gas. In more physical terms, a condensed phase material, such as host medium 100, has vibrational modes which are often referred to as phonons or phonon modes. Vibrations of molecule 104 can easily couple to these host vibrational modes since molecule 104 is in mechanical contact with host medium 100.

Since transition 222 entails energy transfer 232 to macroscopic reservoir 234, it is an incoherent and irreversible process. In other words, the quantum state of molecule 104 does not evolve according to the full density matrix equations of quantum mechanics for all times between transition 220 and transition 224. Instead, coherent time evolution of molecule 104 is interrupted by the incoherent transition 222; more precisely, the off-diagonal elements of the density matrix become small and close to zero. Thus the present invention does not require coherent time evolution, and therefore does not require ultra-low temperatures. In fact, the embodiment of the invention discussed in connection with FIGS. 1a and 1b provides room temperature operation.

Molecule 104 in excited state 204 has a characteristic lifetime T within which (on average) it makes a transition to a lower energy state. The lifetime T is also known as the electronic excited state lifetime in the art. Such transitions can be either radiative transitions in which a single photon is emitted, or non-radiative transitions, in which no photon is emitted. The fluorescence quantum yield is the ratio of the rate of radiative transitions from an excited state to the rate of all transitions from an excited state. Since radiative transitions from state 204 provide the desired single photon emission, while nonradiative transitions do not, molecule 104 preferably has a high fluorescence quantum yield (i.e., preferably>0.8, more preferably>0.9, and most preferably as close to unity as possible). For a preferred molecule 104 having a high fluorescence quantum yield, the lifetime T is about equal to the radiative lifetime Trad. A typical lifetime T is about 1 ns, for a molecule having a high fluorescence quantum yield and an electric dipole allowed transition between the ground state and a lowest energy electronic excited state.

Thus molecule 104 in excited electronic state 204 has a characteristic lifetime T, within which (on average) it will usually, as a result of the preferably high fluorescence quantum yield, make a spontaneous radiative transition 224 from electronic state 204 to a lower energy state. In the example of FIG. 2, transition 224 is to a vibrational state 201 associated with ground state 200. Transition 224 can also be to other final states, as shown by the dotted vertical arrows. During radiative transition 224, a single photon 230 is emitted. The energy of photon 230 is the energy difference between state 204 and the final state of transition 224. Thus, when the single-photon source of the present invention is operated multiple times, the output photon energy varies within a range determined by the range of energies of transition 224. The energy of output photon 230 is less than the energy of pump photon 228 by at least the energy difference between states 207 and 204, which provides spectral separation of pump radiation from single-photon radiation. If T0 is the arrival time of the pump pulse, and T1 is the emission time of photon 230, then the difference T1−T0 is on the order of the lifetime T, since T is longer than all other relevant transition times. Thus the single-photon source of the present invention is a controllable single-photon source with a timing precision of about T.

In some cases, including the example of FIG. 2, molecule 104 is in a vibrational state after transition 224. In these cases, transition 226 to ground state 200 occurs. Transition 226 is similar to transition 222, in that coupling to a macroscopic host reservoir (not shown for transition 226) greatly increases the transition rate by facilitating the required transfer of energy. In other cases, transition 224 is directly to the ground state 200. Once molecule 104 is back in ground state 200, either directly or indirectly as outlined above, it is ready to emit another single photon 230 in response to a pump photon 228 by repeating the above transitions.

Figure 5:
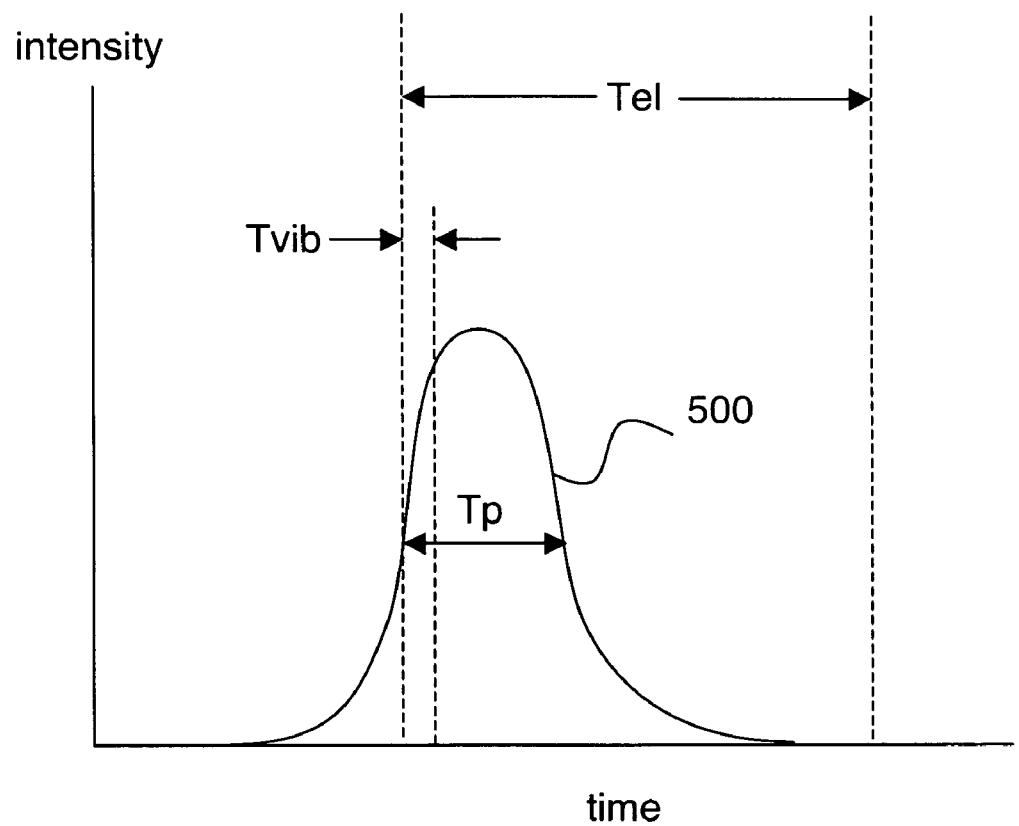
FIG. 5 shows optical intensity vs. time for an optical pump pulse in accordance with an embodiment of the invention.

In order for molecule 104 in host medium 100 to provide single photons in accordance with the transition scheme of FIG. 2, the pump radiation emitted by pump source 110 must satisfy the conditions shown on FIG. 5. FIG. 5 shows optical intensity vs. time for an optical pump pulse 500 in accordance with an embodiment of the invention. The first condition shown on FIG. 5 is that Tp>Tvib, where Tp is the duration of pump pulse 500 and Tvib is the vibrational relaxation time associated with transition 222 on FIG. 2. Preferably, Tp>10 Tvib. By selecting pump pulse 500 in accordance with this condition, the decay from vibrational level 207 to electronic state 204 on FIG. 2 is fast compared to the pump pulse duration. Meeting this condition provides incoherent excitation of molecule 104 by pulse 500. Incoherent excitation of molecule 104 means that Rabi oscillations between ground state 200 and vibrational state 207 do not occur to a significant degree, because vibrational state 207 is rapidly "emptied out" by irreversible transition 222 to electronic state 204. In other words, Rabi oscillations do not occur because the pump pulse is long compared to the dephasing time of state 207, since the dephasing time of state 207 is necessarily less than or equal to Tvib. Incoherent excitation of vibrational state 207 is advantageous because it is not necessary to satisfy a condition on the pump pulse intensity and duration in order to prepare the desired excited state with high probability. That is, pump pulse 500 need not be a π pulse.

The second condition shown on FIG. 5 is that Tp<T, where T is the lifetime of electronic excited state 204. Preferably, Tp<0.1 T. By selecting pump pulse 500 in accordance with this condition, the probability P2+ of emission of two or more photons responsive to a single pump pulse 500 is reduced. In order to obtain two or more photons from a single pump pulse 500, a first transition 220 must occur, followed by a first transition 222, followed by a first transition 224, followed by a second transition 220, followed by a second transition 222, and these five events must occur within the pump pulse duration Tp. The second transition 220 is assumed to be followed by a second transition 224 providing the undesired second photon. The time required for the above five events to occur is dominated by the lifetime T. Thus the probability of the above five events occurring within the pump pulse duration Tp decreases as Tp/T decreases.

In the example of FIGS. 1a and 1b, Tvib is on the order of a ps, T is about 3.8 ns, and Tp is about 35 ps, in accordance with the above preferred conditions.

FIG. 7 shows an alternate embodiment of the invention. The embodiment of FIG. 7 is similar to the embodiment of FIGS. 1a and 1b, except that an optical cavity formed by mirrors 702 and 704 is used to collect single-photon radiation and emit it as a beam 706 with well-defined directional properties. Thus the spatial distribution of single-photon radiation is altered from the spatial distribution of the example of FIGS. 1a and 1b. Provision of an optical cavity can also allow modification of the lifetime T and/or reduction of losses.

Another alternative embodiment of the invention makes use of an illuminated semiconductor nanocrystal (often known as a quantum dot) instead of an illuminated molecule to provide a single photon source. Such a semiconductor nanocrystal will have a largest linear dimension of less than about 10 nm. For this embodiment, with reference to FIG. 1a, active medium 150 includes an illuminated semiconductor nanocrystal 104 in (or on a surface of) a condensed phase host 100. Suitable materials for nanocrystal 104 include semiconductors such as CdSe, CdS, CdTe, ZnSe, ZnS, ZnTe, and alloys thereof. As indicated above, host 100 can be any material which is transparent to pump radiation and emitted radiation. Pulsed optical pumping, as discussed in connection with FIG. 5, is applied. The operation of this embodiment is best appreciated in connection with FIG. 8, which shows an energy level diagram of semiconductor nanocrystal transitions in accordance with this embodiment.

Figure 8:
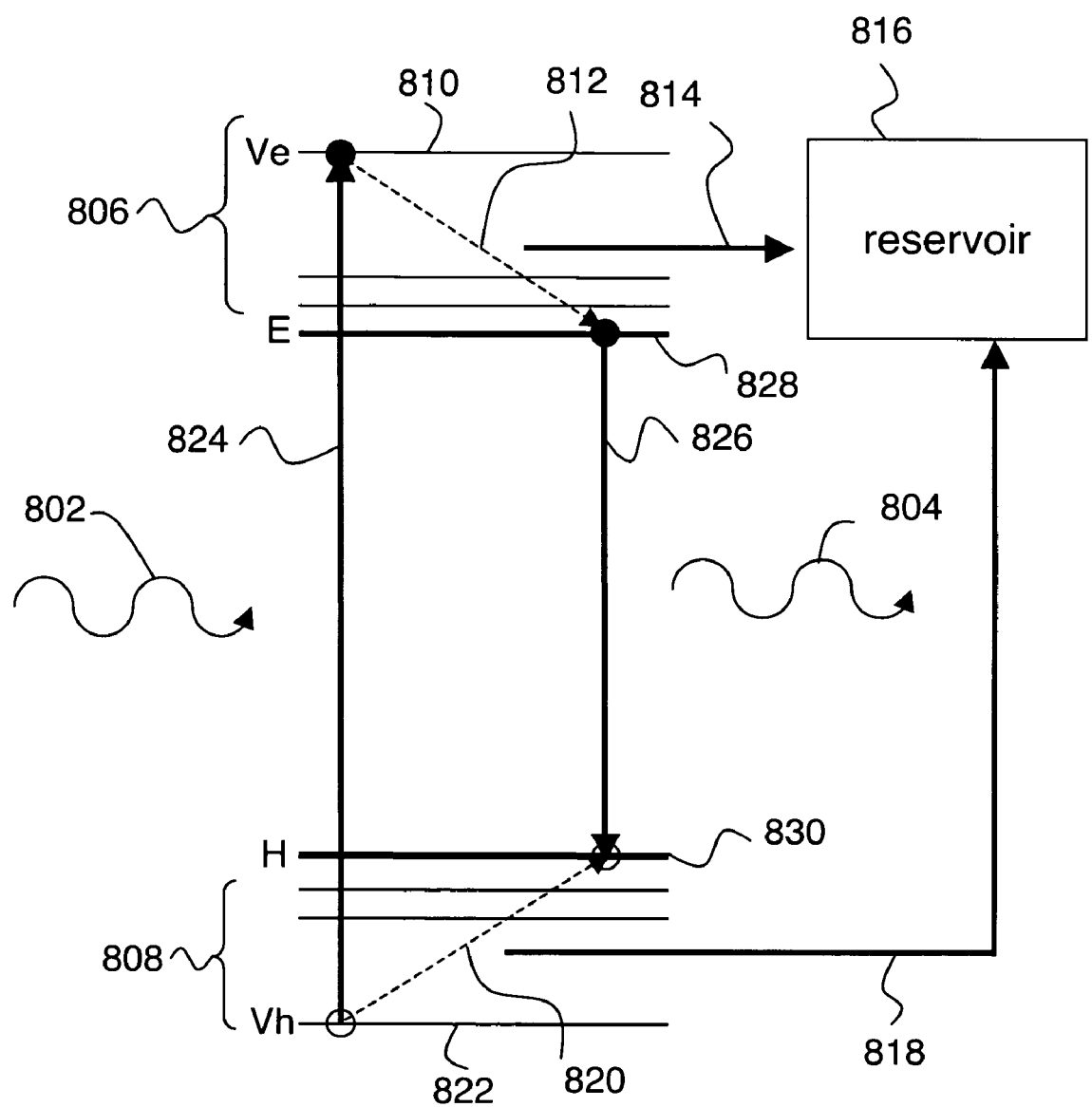
FIG. 8 shows an energy level diagram of semiconductor nanocrystal transitions in accordance with an embodiment of the invention.

On FIG. 8, state E (828) is the lowest conduction band state, and state H (830) is the highest valence band state. A pump photon 802 is incident on the semiconductor nanocrystal, and has an energy Ep greater than Eo, the energy difference between E and H, as shown. Absorption of pump photon 802 by the nanocrystal causes the nanocrystal to make a transition 824 to a vibrational exciton state having a vibrational electron state Ve (810) and a vibrational hole state Vh (822). Vibrational states Ve and Vh lie within vibrational manifolds 806 and 808 respectively. In this context, such vibrational manifolds are usually referred to as phonon sidebands. Since energy is conserved in absorption of pump photon 802, selecting Ep to be greater than Eo ensures excitation of a vibrational exciton state. Typically, if Ep is somewhat larger than Eo (e.g., Ep>1.05 Eo), the required condition that Ep−Eo be greater than one quantum of vibrational energy will be satisfied, since the vibrational energy quantum is usually much less than Eo.

Vibrational states Ve and Vh undergo transitions 812 to state E and 820 to state H respectively. Transitions 812 and 820 are fast, nonradiative, spontaneous, irreversible, and incoherent transitions, having a characteristic vibrational relaxation time (or lifetime) of Tvib. In cases where transitions 812 and 820 have significantly different relaxation times, Tvib is defined to be the longer of the two relaxation times. In order to make a transition from vibrational state 810 to electron state 828, an energy 814 equal to the energy difference between states 810 and 828 must be transferred to the host. The host acts as a macroscopic reservoir 816 capable of absorbing this energy difference (e.g., as heat). Similarly, reservoir 816 also absorbs energy 818 emitted in the transition from vibrational state 822 to hole state 830. Since transitions 812 and 820 entail energy transfer to macroscopic reservoir 816, these are incoherent and irreversible process. Thus this embodiment of the invention does not require coherent time evolution, and therefore does not require ultra-low temperatures.

An electron in state 828 and a hole in state 830 have a characteristic lifetime T within which (on average) recombination 826 of the electron with the hole occurs. The lifetime T is also known as the recombination time in the art. Preferably, the semiconductor nanocrystal has high fluorescence quantum yield. Thus recombination 826 is usually accompanied by emission of a single photon 804, having an energy equal to the energy difference Eo between states 828 and 830. If T0 is the arrival time of the pump pulse, and T1 is the emission time of photon 804, then the difference T1−T0 is on the order of the lifetime T, since T is longer than all other relevant transition times. Thus the single-photon source provided by this embodiment of the present invention is also a controllable single-photon source with a timing precision of about T.

The above detailed description has been by way of example, not restriction, and so many modifications of the above examples are also suitable for practicing the invention.

For example, a liquid medium can also be used as host medium 100, as well as the solid media discussed above. In such a case, molecule 104 will also have rotational levels corresponding to rotational degrees of freedom in addition to the above-discussed vibrational levels. However, the presence of rotational levels and states will not alter the essential character of the invention. In particular, excitation to a vibrational level which irreversibly decays to its associated electronic state remains a key feature of the invention for this case.

Another modification relates to the chemical composition of molecules 102 and 104. In most cases, molecules 102 and 104 have the same chemical composition, as in the example of FIGS. 1a and 1b where molecules 102 and 104 are both terrylene. However, a variety of different molecular species can be included within host medium 100. In this case, the selection of which kind of molecule to illuminate will affect the resulting properties of the single-photon source.

Molecule 104 can be any molecule that is highly emissive when embedded in a condensed phase host. Suitable classes of molecules for molecules 104 include, but are not limited to, laser dyes, fluorescent labeling dyes, and dyes.

What is claimed is:
1. A method for emitting, at a controllable time, a single-photon optical signal, the method comprising:
 a) providing an optical pump source emitting pump radiation having a pump photon energy Ep;
 b) providing an active medium comprising:
  i) a transparent condensed phase host; and
  ii) one or more molecules within or on said host which are chemically distinct from said host and fluorescent responsive to said pump radiation;
 c) illuminating a single one of said molecules at a time T0 with a pulse of radiation from said pump source having a pulse duration Tp, wherein said pump photon energy Ep corresponds to a transition between a ground state G of said single molecule and a vibrational state V associated with an excited electronic state E of said single molecule, said single molecule having a vibrational relaxation time Tvib for a transition from V to E and having a lifetime T for a transition from E to a state having lower energy, and wherein said pulse duration Tp is selected such that Tvib<Tp<T; and
 d) emitting output radiation having an output photon energy Eout from said active medium responsive to said pump pulse, wherein said output radiation is substantially radiation emitted from said single molecule, and wherein said output radiation is emitted at a time T1 such that T1−T0 is on the order of T, and wherein a probability P1 of said output radiation consisting of exactly one photon is substantially greater than a probability P2+ of said output radiation consisting of 2 or more photons;

whereby said controllable single-photon optical signal is provided.

2. The method of claim 1, wherein Tp<0.1 T.

3. The method of claim 1, wherein Tp>10 Tvib.

4. The method of claim 1, wherein Eo is an energy difference between said state E and said state G, and wherein Ep>1.05 Eo.

5. The method of claim 1, wherein Eout corresponds to a transition from said state E to said state G.

6. The method of claim 1, wherein Eout corresponds to a transition from said state E to a vibrational state associated with said state G.

7. The method of claim 1, wherein said active medium is at about room temperature.

8. The method of claim 1, further comprising positioning said active medium host within an optical cavity.

9. A controllable single-photon source comprising:
   a) an optical pump source emitting a pulse of pump radiation at a time T0 having a pump photon energy Ep and a pulse duration Tp; and
   b) an active medium emitting output radiation having an output photon energy Eout responsive to said pump pulse, the active medium comprising:
      i) a transparent condensed phase host; and
      ii) one or more molecules within or on said host which are chemically distinct from said host and fluorescent responsive to said pump radiation, wherein a single one of said molecules is illuminated by said pump pulse, and wherein said pump photon energy Ep corresponds to a transition between a ground state G of said single molecule and a vibrational state V associated with an excited electronic state E of said single molecule, said single molecule having a vibrational relaxation time Tvib for a transition from V to E and having a lifetime T for a transition from E to a state having lower energy;
   wherein said pulse duration Tp is selected such that Tvib<Tp<T; and
   wherein said output radiation is substantially radiation emitted from said single molecule; and
   wherein said output radiation is emitted at a time T1 such that T1−T0 is on the order of T; and
   wherein a probability P1 of said output radiation consisting of exactly one photon is substantially greater than a probability P2+ of said output radiation consisting of 2 or more photons.

10. The single-photon source of claim 9, wherein Tp<0.1 T.

11. The single-photon source of claim 9, wherein Tp>10 Tvib.

12. The single-photon source of claim 9, wherein Eo is an energy difference between said state E and said state G, and wherein Ep>1.05 Eo.

13. The single-photon source of claim 9, wherein Eout corresponds to a transition from said state E to said state G.

14. The single-photon source of claim 9, wherein Eout corresponds to a transition from said state E to a vibrational state associated with said state G.

15. The single-photon source of claim 9, wherein said active medium is at about room temperature.

16. The single-photon source of claim 9, further comprising an optical cavity surrounding said active medium.

17. The single-photon source of claim 9, wherein said condensed phase host has a thickness of about 10 microns.

18. The single-photon source of claim 9, wherein said single molecule has a photobleaching quantum efficiency of less than about $10^{-7}$.

19. The single-photon source of claim 9, wherein said single molecule has a fluorescence quantum yield for transitions from E greater than about 0.8.

20. The single-photon source of claim 9, wherein T is on the order of 1 ns.

21. The single-photon source of claim 9, wherein said single molecule has an electric dipole allowed transition between said state G and said state E.

22. The single-photon source of claim 9, wherein said state E is an electronic excited state having lowest energy.

23. The single-photon source of claim 9, wherein said single molecule is a molecule selected from the group consisting of terrylene, a derivative of terrylene, dibenzoanthanthrene, a derivative of dibenzoanthanthrene, pentacene, a derivative of pentacene, perylene, and a derivative of perylene.

24. The single-photon source of claim 23, wherein said single molecule is a terrylene molecule.

25. The single-photon source of claim 9, wherein said single molecule is a planar aromatic hydrocarbon molecule.

26. The single-photon source of claim 9, wherein said single molecule is a laser dye molecule, a fluorescent labeling dye molecule, or a dye molecule.

27. The single-photon source of claim 9, wherein said condensed phase host comprises a solid host.

28. The single-photon source of claim 27, wherein said solid host comprises p-terphenyl.

29. The single-photon source of claim 27, wherein said solid host comprises a molecular crystal or an amorphous organic solid.

30. A method for emitting, at a controllable time, a single-photon optical signal, the method comprising:
   a) providing an optical pump source emitting pump radiation having a pump photon energy Ep;
   b) providing an active medium comprising:
      i) a transparent condensed phase host; and
      ii) one or more semiconductor nanocrystals within or on said host which are chemically distinct from said host and fluorescent responsive to said pump radiation;
   c) illuminating a single one of said semiconductor nanocrystals at a time T0 with a pulse of radiation from said pump source having a pulse duration Tp, wherein said pump photon energy Ep corresponds to a transition between a ground state of said semiconductor nanocrystal and a vibrational exciton state having a vibrational electron state Ve and a vibrational hole state Vh associated with an electron state E and a hole state H respectively, said semiconductor nanocrystal having a vibrational relaxation time Tvib for transitions from Ve to E and from Vh to H, and having a lifetime T for recombination of E and H, and wherein said pulse duration Tp is selected such that Tvib<Tp<T; and
   d) emitting output radiation having an output photon energy Eout from said active medium responsive to said pump pulse, wherein said output radiation is substantially radiation emitted from said single semiconductor nanocrystal, and wherein said output radiation is emitted at a time T1 such that T1−T0 is on the order of T, and wherein a probability P1 of said output radiation consisting of exactly one photon is substantially greater than a probability P2+ of said output radiation consisting of 2 or more photons;
   whereby said controllable single-photon optical signal is provided.

31. The method of claim 30, wherein Tp<0.1 T.

32. The method of claim 30, wherein Tp>10 Tvib.

33. The method of claim 30, wherein Eo is an energy difference between said state E and said state H, and wherein Ep>1.05 Eo.

34. The method of claim 30, wherein said active medium is at about room temperature.

35. The method of claim 30, further comprising positioning said active medium host within an optical cavity.

36. A controllable single-photon source comprising:
a) an optical pump source emitting a pulse of pump radiation at a time T0 having a pump photon energy Ep and a pulse duration Tp; and
b) an active medium emitting output radiation having an output photon energy Eout responsive to said pump pulse, the active medium comprising:
  i) a transparent condensed phase host; and
  ii) one or more semiconductor nanocrystals within or on said host which are chemically distinct from said host and fluorescent responsive to said pump radiation, wherein a single one of said semiconductor nanocrystals is illuminated by said pump pulse, and wherein said pump photon energy Ep corresponds to a transition between a ground state of said single semiconductor nanocrystal and a vibrational exciton state having a vibrational electron state Ve and a vibrational hole state Vh associated with an electron state E and hole state H respectively, said single semiconductor nanocrystal having a vibrational relaxation time Tvib for transitions from Ve to E and from Vh to H, and having a lifetime T for recombination of E and H;
wherein said pulse duration Tp is selected such that Tvib<Tp<T; and
wherein said output radiation is substantially radiation emitted from said single semiconductor nanocrystal; and
wherein said output radiation is emitted at a time T1 such that T1−T0 is on the order of T; and
wherein a probability P1 of said output radiation consisting of exactly one photon is substantially greater than a probability P2+ of said output radiation consisting of 2 or more photons.

37. The single-photon source of claim 36, wherein Tp<0.1 T.

38. The single-photon source of claim 36, wherein Tp>10 Tvib.

39. The single-photon source of claim 36, wherein Eo is an energy difference between said state E and said state H, and wherein Ep>1.05 Eo.

40. The single-photon source of claim 36, wherein said active medium is at about room temperature.

41. The single-photon source of claim 36, further comprising an optical cavity surrounding said active medium.

42. The single-photon source of claim 36, wherein said single semiconductor nanocrystal has a photobleaching quantum efficiency of less than about $10^{-7}$.

43. The single-photon source of claim 36, wherein said single semiconductor nanocrystal has a fluorescence quantum yield for recombination greater than about 0.8.

44. The single-photon source of claim 36, wherein said single semiconductor nanocrystal is selected from the group consisting of CdSe, CdS, CdTe, ZnSe, ZnS, ZnTe, and alloys thereof.

* * * * *